United States Patent [19]

Trefz et al.

[11] Patent Number: 5,138,825

[45] Date of Patent: Aug. 18, 1992

[54] RIDING MOWER HAVING A PEDAL OPERATED HEIGHT ADJUSTMENT MECHANISM, AIR ASSISTED DISCHARGE, AND IMPROVED HYDROSTATIC SHIFT LINKAGE

[75] Inventors: Harlin J. Trefz; Daniel T. Hergatt; Keith A. Mosley, all of Jackson, Tenn.; Douglas A. Pohl, Galesburg, Ill.

[73] Assignee: Noma Outdoor Products, Inc., Jackson, Tenn.

[21] Appl. No.: 625,553

[22] Filed: Dec. 11, 1990

[51] Int. Cl.[5] .................... A01D 34/64; A01D 34/70; A01D 34/74

[52] U.S. Cl. ...................... 56/11.1; 56/13.3; 56/17.1; 56/202; 56/DIG. 22

[58] Field of Search ............ 56/10.8, 11.1, 11.3, 56/16.6, 17.1, 202, DIG. 8, DIG. 22, DIG. 6, 13.3

[56] References Cited

U.S. PATENT DOCUMENTS

| | | | |
|---|---|---|---|
| 1,614,386 | 1/1927 | Peebles et al. | 56/13.4 |
| 1,899,564 | 2/1933 | Frey | 56/13.4 |
| 2,076,056 | 4/1937 | Woodford | 56/11.2 |
| 2,491,544 | 12/1949 | Arkenberg | 56/12.9 |
| 2,848,859 | 8/1958 | Abel | 56/17.2 |
| 2,945,338 | 7/1960 | Burrows et al. | 56/17.2 |
| 3,091,906 | 6/1963 | Hall | 56/13.4 |
| 3,430,421 | 3/1969 | Matthews | 56/12.9 |
| 3,483,682 | 12/1969 | Root | 56/17.2 |
| 3,742,685 | 7/1973 | Lian et al. | 56/7 |
| 3,984,893 | 10/1976 | Ashley | 15/339 |
| 4,120,136 | 10/1978 | Rose | 56/17.1 |
| 4,316,356 | 2/1982 | Planeta | 56/16.2 |
| 4,395,865 | 8/1983 | Davis Jr. et al. | 56/13.3 |
| 4,433,532 | 2/1984 | McCunn | 56/202 X |
| 4,597,251 | 7/1986 | Cornellier | 56/17.6 |
| 4,773,205 | 9/1988 | Hansen et al. | 56/202 X |
| 4,920,734 | 5/1990 | Wenzel | 56/11.1 |
| 4,934,130 | 6/1990 | Johansson et al. | 56/17.2 |

Primary Examiner—David J. Bagnell
Attorney, Agent, or Firm—Heiskell, Donelson, Bearman, Adams, Williams & Kirsch

[57] ABSTRACT

A riding mower is provided having a generally conventional engine, seat, frame, cutting deck and hydrostatic transmission. The cutting deck may be vertically adjusted for a plurality of cutting height settings, and may be locked in its uppermost setting and returned to the pre-selected cutting height, by selective operation of a foot-operated pedal. Linkage connects the pedal to the deck and to a variable-height adjustment link. A transmission speed control includes a handle protruding upwardly adjacent the seat, connected to a transverse control rod with a distal end operatively secured to the conventional speed adjustment mechanism of the transmission. Positioned adjacent the distal end of the control rod is a friction-generating device which engages the rod and prevents unintentional movement thereof. A grass collection bag is included with a blower mounted on the cutting deck for providind an enhanced airflow from the cutting deck through the duct leading to the bag.

35 Claims, 5 Drawing Sheets

5,138,825

RIDING MOWER HAVING A PEDAL OPERATED HEIGHT ADJUSTMENT MECHANISM, AIR ASSISTED DISCHARGE, AND IMPROVED HYDROSTATIC SHIFT LINKAGE

FIELD OF THE INVENTION

The present invention relates generally to riding lawn mowers, and, more particularly, to riding mowers having improved cutting height adjustment, grass collection, and transmission control features.

DESCRIPTION OF THE PRIOR ART

Various types of riding lawn mowers have been in use for many years, making the general concept well known in the art. Certain features, such as an engine, a frame, a seat, a cutting deck, and a transmission are fundamental to the operation of virtually every riding mower known in the industry. Furthermore, it is generally well known that certain other features are highly desirable, if not essential, such as a grass catching attachment, a multiple speed transmission, and provisions for adjusting the height of the cutting deck.

Cutting deck height adjustment mechanisms of the prior art typically include a hand-operated lever which the driver must pull to raise the cutting deck. Typically, the cutting deck is lowered by first pushing a button on the handle of the lever to release the lever from its uppermost locked position, and pushing the handle forward. Or, rather than having a release button mounted on the handle, some levers are designed to be pushed laterally in order to disengage a locking member disposed on the lever, and pushing the lever to lower the cutting deck (or, rather, letting the weight of the cutting deck pull the lever forward). Some prior art mowers also allow the user to select from several cutting deck height settings, usually by stopping the hand-operated lever at one of several intermediate positions between the extreme upper and lower settings.

The primary disadvantage to the above described height adjustment mechanisms is that they are oftentimes difficult to operate by those with average or less than average arm strength. Women and teenagers in particular frequently experience great difficulty in pulling a lever to raise the cutting deck to its highest position, and in carefully lowering the deck to the desired setting. Furthermore, prior art mechanisms generally do not allow the driver to conveniently raise the cutting deck from its desired setting to the uppermost position in order to clear an obstacle or when finished mowing, then release the deck to its desired setting without paying careful attention to the setting. Accordingly, it has been found to be desirable for a height adjustment mechanism to be foot-operated, so that even slight drivers can easily raise the cutting deck, and for the mechanism to have a reliable setting "memory" so that the deck may be raised occasionally and released to automatically return to its former setting.

Attachments for catching grass and other clippings are also well known in the art. Such devices typically include a bag or other container mounted on the rear of the mower, with duct work connecting the top of the container to the discharge chute on the cutting deck. Most such prior art mowers rely solely on the air pressure created by the cutting blade or blades to carry the grass from the discharge chute to the container. As an improvement to such devices, some prior art mowers include a blower which serves to pump the clippings from the cutting deck to the container. Such air-assisted discharge systems suffer from reliability problems, since the blower must frequently propel sticks, rocks, and other hard objects which tend to damage the vanes. Additionally, with prior art devices having a blower mounted in-line between the cutting deck and the clipping container, the lawn mower is effectively out-of-order if the blower ceases to function properly. Accordingly, it is desirable to provide a blower which pumps only air, and which allows the mower to continue operating effectively in case of complete failure of the lower.

Variable speed hydrostatic transmission's have been employed for use in riding lawn mowers for several years. Such transmissions provide a wide range of vehicle velocities for a constant engine speed, and provide exceptionally smooth operation as compared to purely mechanical drive trains. Typically, the control lever for a hydrostatic transmission is located in the vicinity of the dash area, and provides multiple stops corresponding to different speed settings. Known control mechanisms of this sort generally suffer from reliability problems arising from their unnecessary complexity, and do not provide for infinitely variable transmission speeds. It has been found desirable to provide a hydrostatic transmission control mechanism having a conveniently located control lever connected to relatively simple linkage, providing for settings at virtually any speed within the range of the transmission.

SUMMARY OF THE PRESENT INVENTION

The principal object of the present invention is to provide a riding lawn mower having improved features which overcome the disadvantages of the prior art discussed above. Namely, an object of this invention is to provide a riding mower having a foot operated deck height adjustment mechanism, with multiple height settings, which enables the user to raise the deck to its highest setting, lock the deck in place if so desired, and lower the deck to its preferred cutting height with ease. Another object is to provide a riding mower having an air-assisted grass discharge system which is durable and allows the unassisted discharge in the event that the blower becomes inoperable. A further object of this invention is to provide a riding mower with a hydrostatic transmission having a convenient, infinitely adjustable, and mechanically simple control mechanism.

In accordance with the teachings of the present invention, there is disclosed herein a preferred embodiment of a riding lawn mower having an improved deck height adjustment mechanism, air-assisted discharge system, and hydrostatic control linkage.

The deck height adjustment mechanism of the present invention is pedal-activated, so that the driver can raise the cutting deck to its extreme uppermost position simply by depressing a pedal located on the footrest. In the preferred embodiment, the pedal includes a locking device which automatically secures the cutting deck in its uppermost position upon depression of the pedal, with disengagement of the locking device also effected by the user's foot. With the cutting deck in its lowered position, the cutting height is determined by the position of a multi-positionable support link. The unique relationship between the support link and the pedal-operated lifting mechanism allows the cutting deck to be raised without affecting the setting of the support link, and subsequently lowered to its previous setting without requiring undue attention from the driver.

The air-assisted discharge system of the present invention includes a blower centrally mounted on top of the cutting deck. Belt-driven by a pulley connected to the engine, the blower pumps air into the conventional grass collection system at a point closely adjacent the discharge chute of the cutting deck, thereby blowing the clippings into the collecting container.

The hydrostatic transmission control linkage of the present invention includes a lever conveniently mounted adjacent the seat, so that the driver's hand falls readily on the control handle. The lever operates a transverse linkage which is connected to the transmission speed selector. A bracket secured to the frame of the mower includes a friction generating device which interacts with the transverse linkage to hold the linkage in the desired setting throughout the entire range of motion of the speed selector.

The above stated and other objects of the present invention will become apparent from the reading of the following specification taken in conjunction with the enclosed drawings.

DETAILED DESCRIPTION OF THE PREFERRED EMBODIMENT

Figure 1:
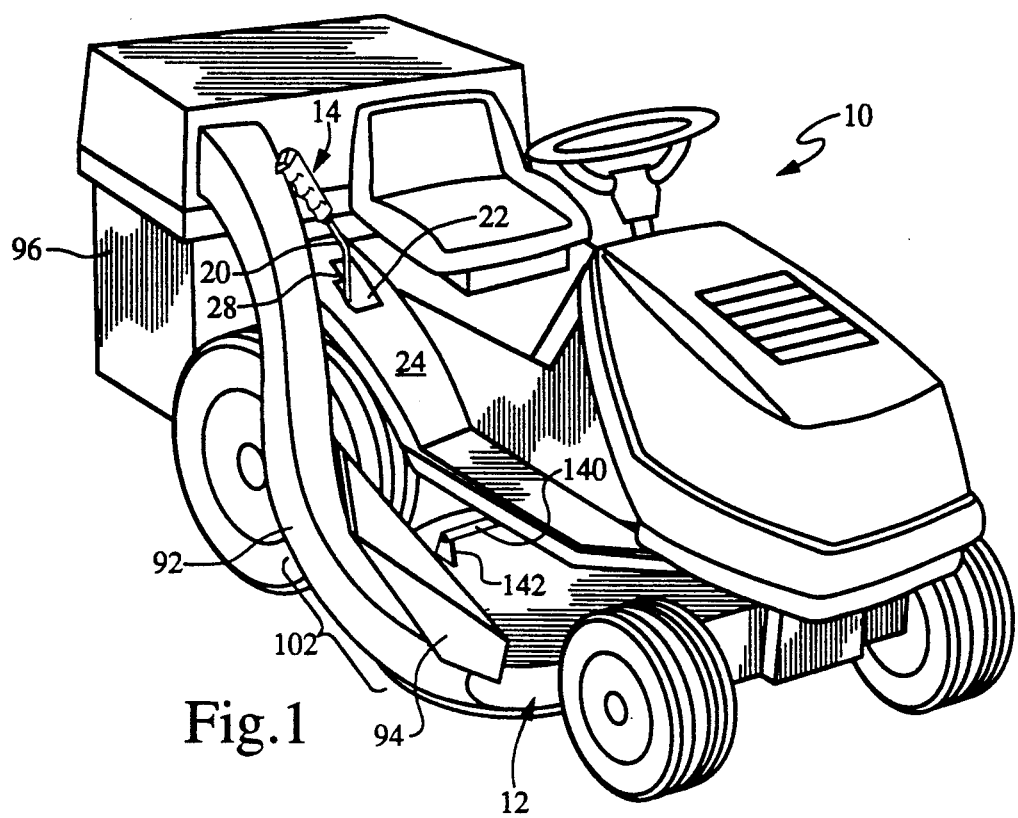
FIG. 1 is a right-side perspective view of the riding mower of this invention.
Figure 2:
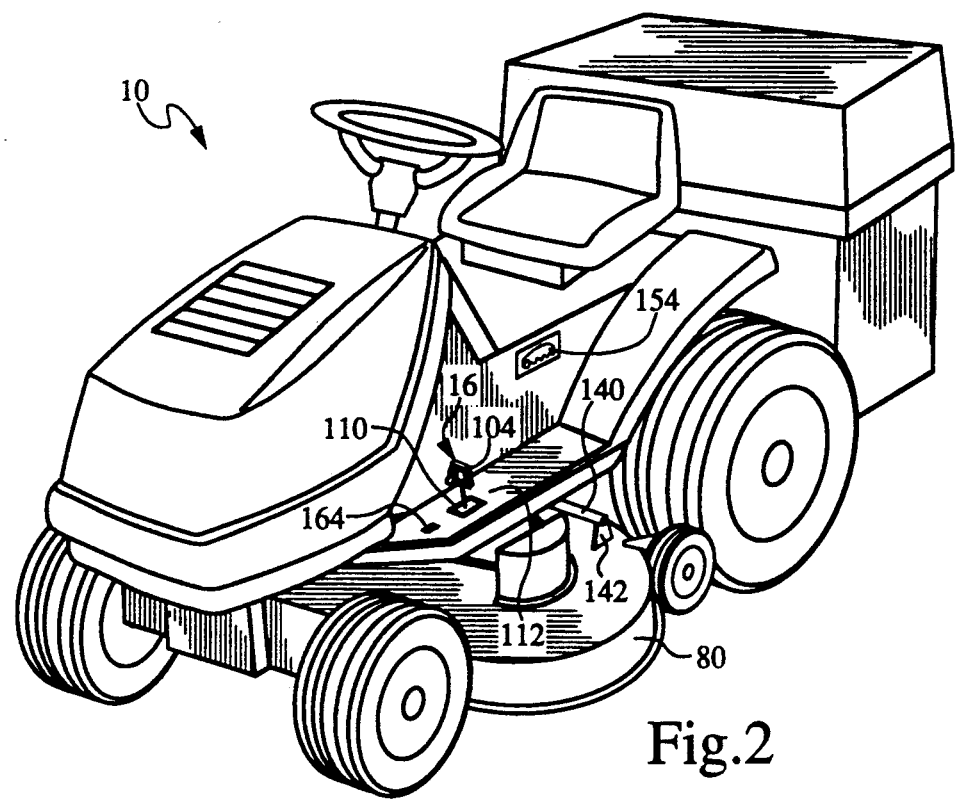
FIG. 2 is a left-side perspective view of the riding mower of the present invention.

Referring initially to FIGS. 1 and 2, riding lawn mower 10 is illustrated as including air-assisted discharge system 12, hydrostatic shift linkage 14, and foot-operated pedal height adjustment mechanism 16. The remainder of riding mower 10 is considered to be conventional and is depicted only generally for purposes of illustrating the preferred embodiment of the present invention. Those skilled in the art will readily understand the relationship of the purely conventional components to system 12, linkage 14, and mechanism 16 in light of the description and drawings set forth herein.

Figure 3:
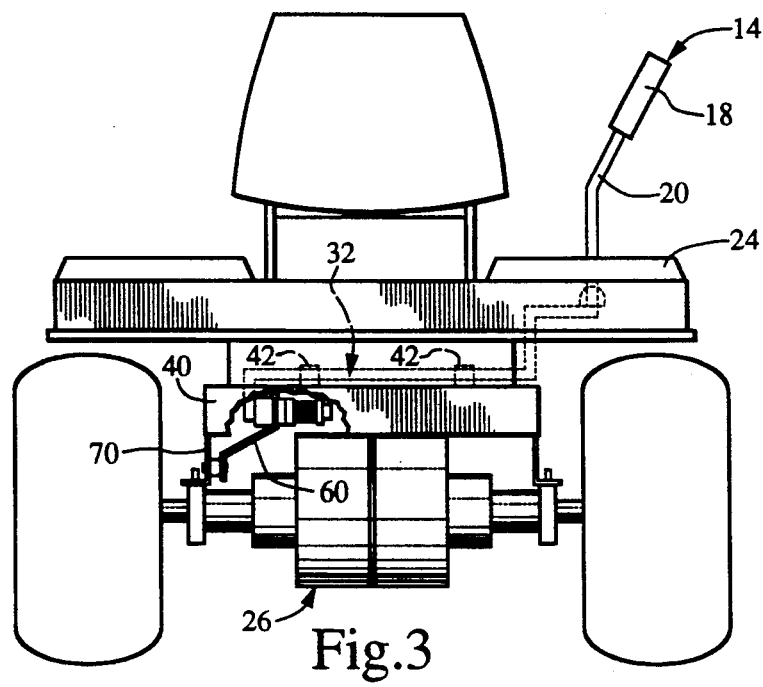
FIG. 3 is a rear-elevational view of the riding mower of the present invention, partially fragmented to show certain portions of the hydrostatic transmission control linkage, with other portions of the linkage shown in phantom.
Figure 4:
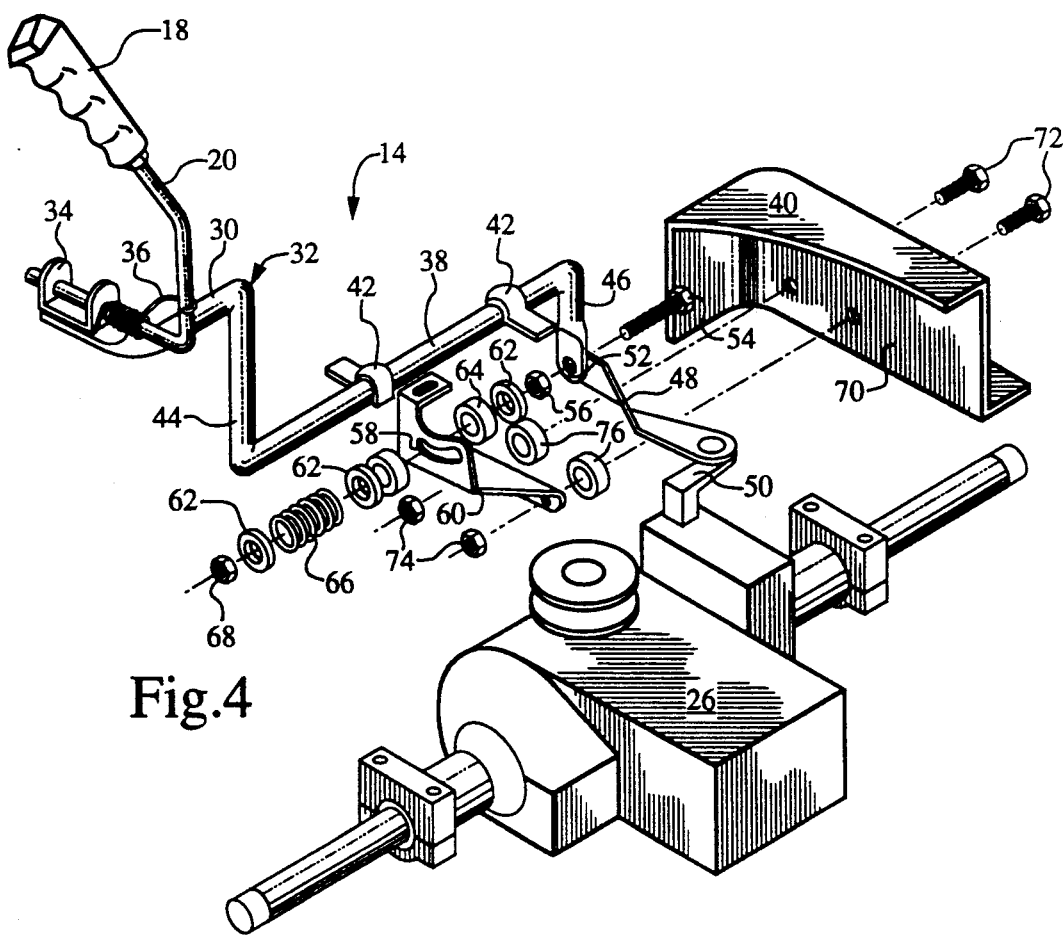
FIG. 4 is an exploded view of the hydrostatic control linkage of the present invention.

As best illustrated in FIGS. 3 and 4, hydrostatic shift linkage 14 consists of handle 18 secured to the distal end of control lever 20 which extends generally vertically through slot 22 in rear fender 24. As illustrated in FIG. 1, control lever 20 may be straight; however, the preferred configuration is angled outwardly as shown in FIGS. 3 and 4. As with prior art designs, slot 22 may include a plurality of transverse indentations in one side thereof for selectively engaging control lever 20, each of said indentations corresponding to a different speed setting for transmission 26. It is also contemplated that slot 22 include no such indentations so that control lever 20 may be positioned virtually anywhere along the link of slot 22, thereby providing for a number of speed control settings completely unlimited by the number of indentations. In the preferred embodiment shown, slot 22 includes no such indentations, but includes a single protrusion 28 which corresponds to the reverse setting of hydrostatic transmission 26.

Upper curved portion 30 of control rod 32 is secured in a spring-loaded manner to control lever 20 by means of bracket 34 and torsion spring 36. Lateral portion 38 of control rod 32 is secured to frame 40 by means of clamps 42, which allow rotational movement of control rod 32 about the longitudinal axis of lateral portion 38. As shown in FIG. 4, control rod 32 further includes a first downwardly extending portion 44 connecting upper curved portion 30 to lateral portion 38, and a second downwardly extending portion 46 which is pivotally secured at its distal end to link 48. In the preferred embodiment shown, link 48 is generally longitudinal with respect to riding mower 10, and is operatively secured to speed adjustment member 50 of transmission 26. The operation of speed adjustment member 50 and transmission 26 are purely conventional and will be well understood to those skilled in the art.

The distal end of control rod 32 has hole 52 formed therein which aligns with a similar hole (not shown) in link 48. When assembled, bolt 54 extends through hole 52 and the adjacent hole in link 48 and is secured therein by nut 56. The threaded end of bolt 54 extends through slot 58 and bracket 60, with washers 62, frictional elements 64, and compression spring 66 all being fitted onto bolt 54 and retained by nut 58 as shown in FIG. 4.

Figure 5:
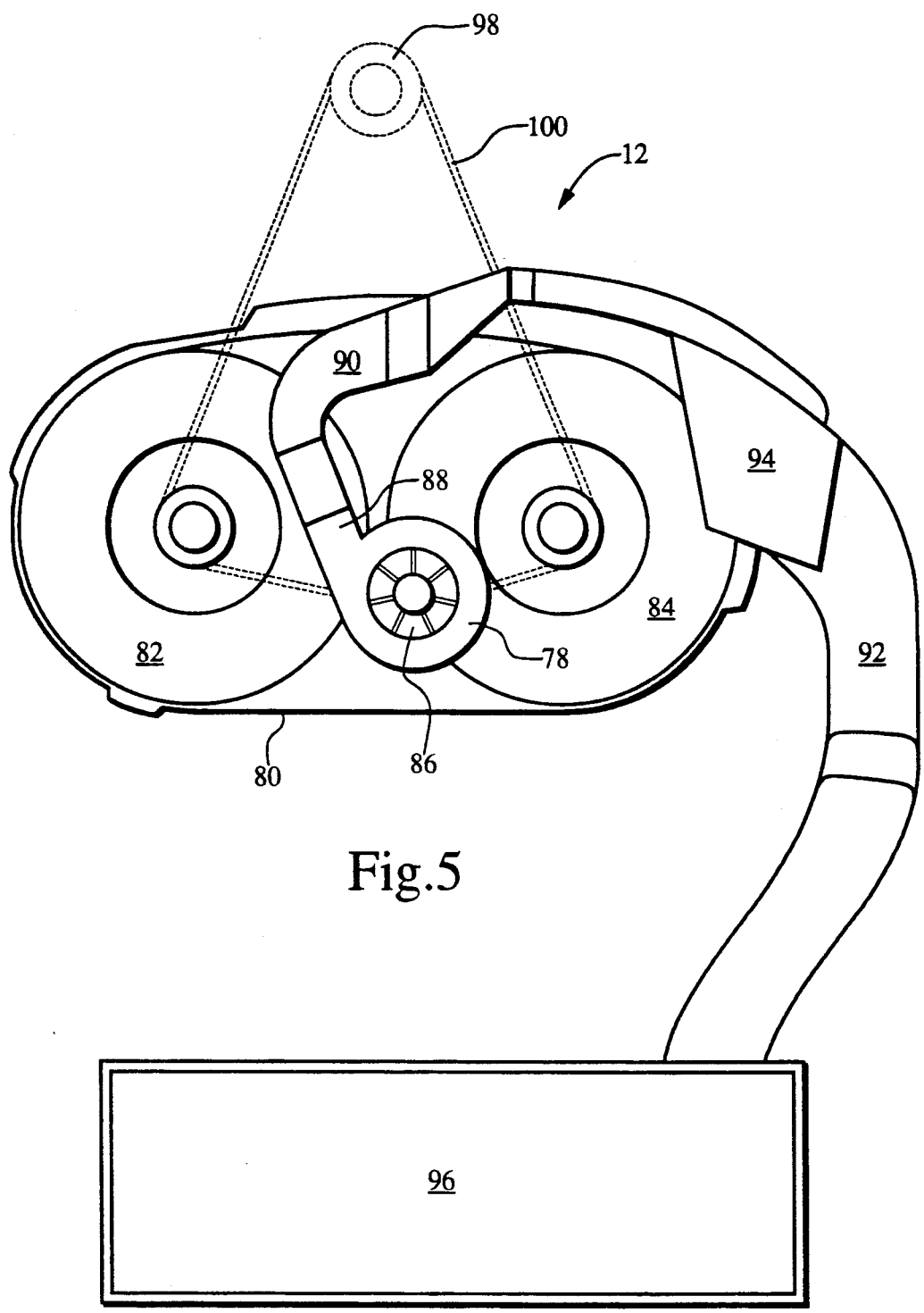
FIG. 5 is a top plan view of the air-assisted grass discharge system of the present invention.

Bracket 60 is secured to lower vertical wall 68 of frame 40, preferably by means of screws 70, nuts 72, and resilient spacers 74. When assembled in this manner, fore and aft movement of handle 18 results in corresponding fore and aft movement of downwardly extending position 46, which, in turn, produces substantially linear fore and aft movement of speed adjustment member 50. The movement of downwardly extending portion 46 is resisted by the abrasive action of frictional elements 64 bearing on the opposite side portions of bracket 60 adjacent slot 58. The degree of such resistance may be adjusted, if desired, by loosening or tightening nut 68, thereby decreasing or increasing, respectively, the force exerted by compression spring 66. By suitably adjusting the pressure between frictional elements 64 and bracket 60, linkage 14 can be maintained at any given setting within the range of movement of control lever 20 within slot 22 without the need for any additional mechanical engagement means. FIG. 5 represents a top plan view of the air-assisted discharge system 12 incorporated in the preferred embodiment of riding mower 10. Blower 78 is mounted atop otherwise conventional cutting deck 80 which, in the preferred embodiment shown, includes two cutting blade housings 82 and 84. The construction of deck 80 and housings 82 and 84 is purely conventional and will be readily known to those skilled in the art.

Blower 78 is of a generally conventional design, and includes an intake area 86 and a high velocity output nozzle 88. Conduit 90 routes the air provided by blower 78 to an area of duct 92 generally adjacent and slightly upstream of conventional discharge chute 94 which, as those skilled in the art will fully understand, directs grass and other clippings through duct 92 into collection container 96 for storage and subsequent disposal.

In the preferred embodiment of riding mower 10, blower 78 is driven by means of pulley 98 extending from the engine (not shown) which engages belt 100. Pulley 98 and belt 100 are typically employed on prior art devices to drive the cutting blades, so that blower 78 and its accompanying conduit work 90 may be retro-fitted relatively easily to conventional mowers.

When configured as shown, pulley 78 operates to draw air inwardly through intake area 86 and force the air at a relatively high velocity through conduit 90 into duct 94 at area 102 slightly upstream of discharge chute 92. Those knowledgeable about conventional riding mowers will readily understand that the burst of high velocity air provided by blower 78 will prevent the clogging of grass, particularly when cut wet, which frequently occurs at or near area 102 of duct 92.

Figure 6:
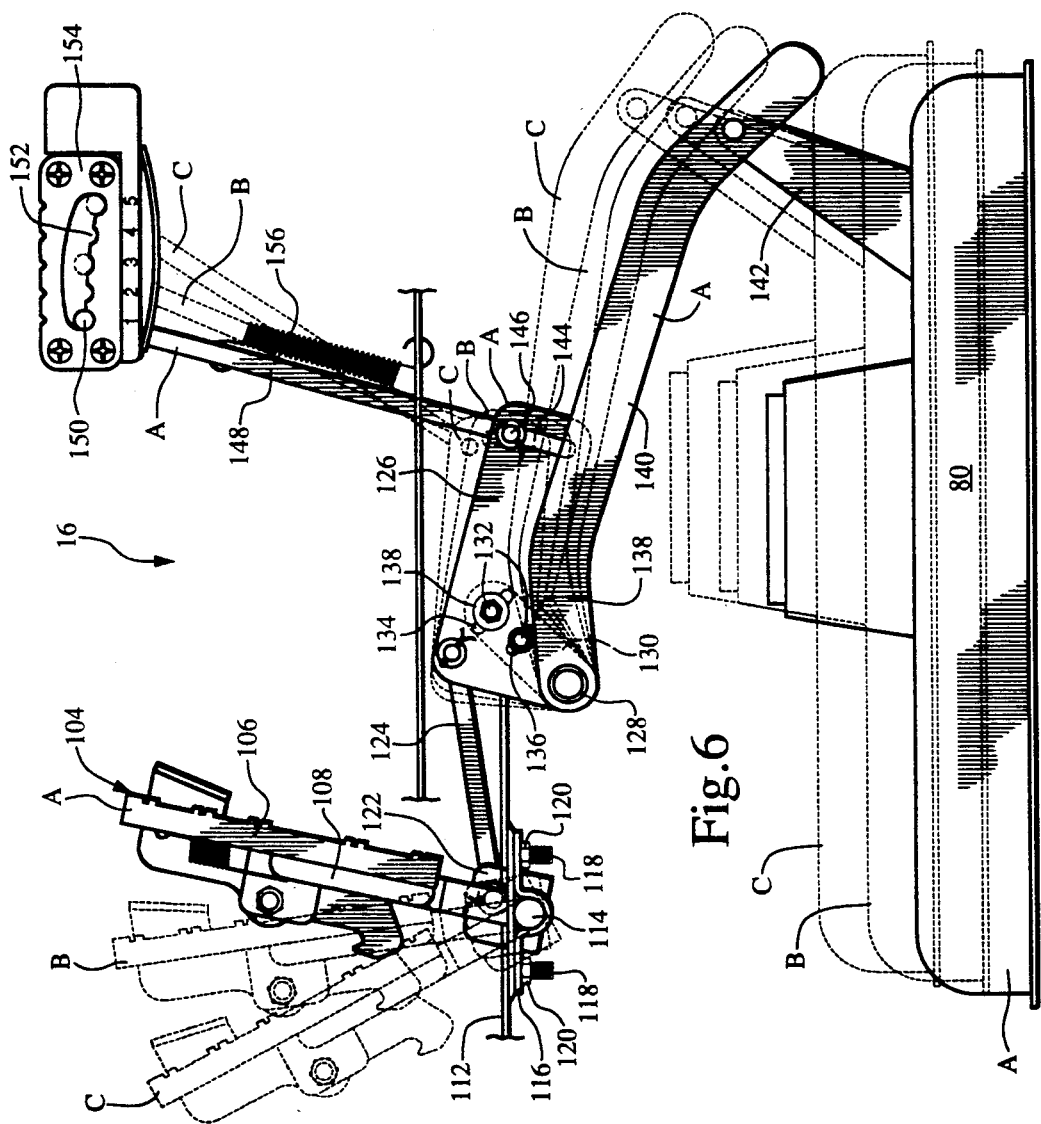
FIG. 6 is a side schematic view of the foot-operated height adjustment mechanism of the present invention, shown in multiple settings.
Figure 7:
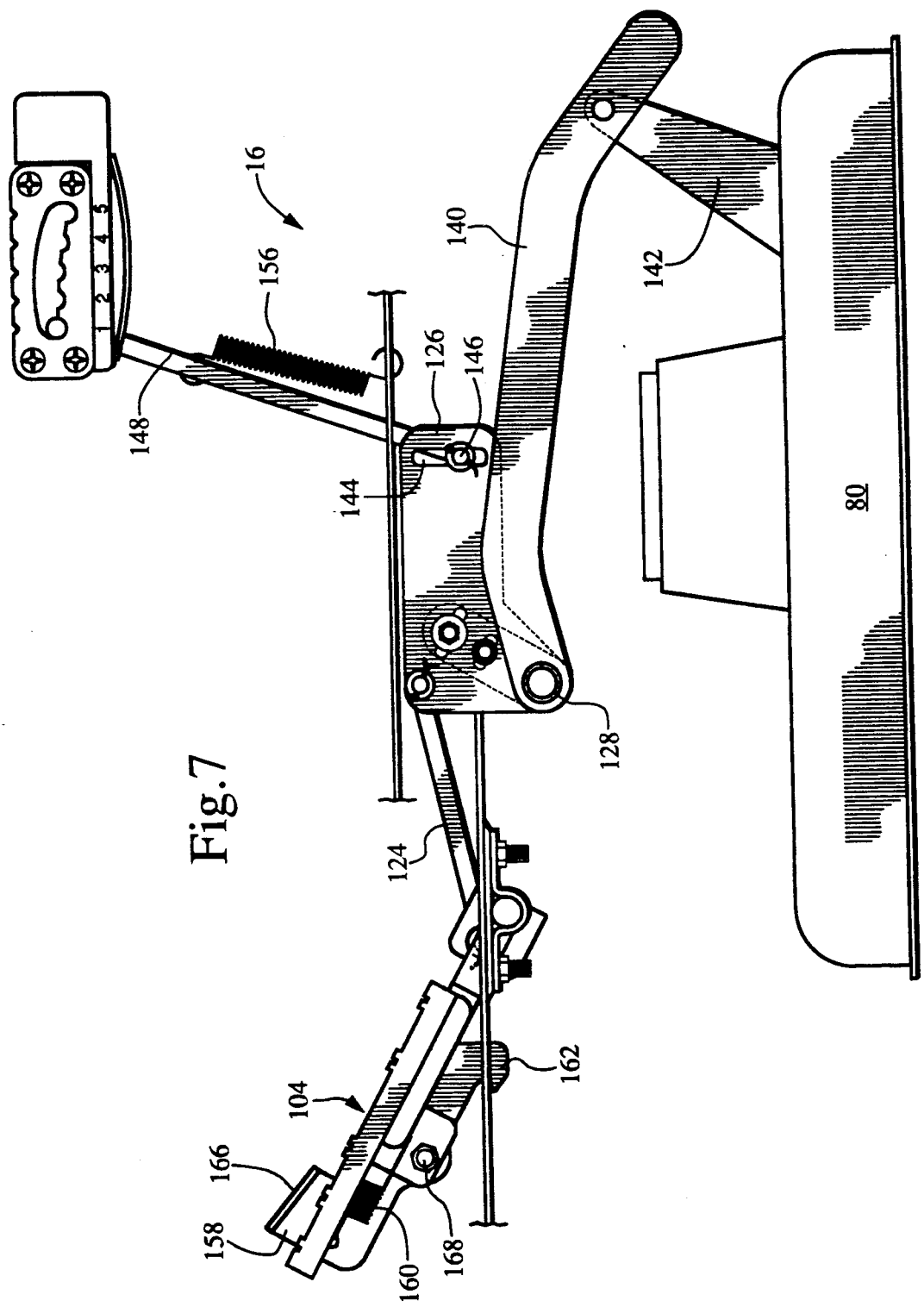
FIG. 7 is a side schematic view of the foot-operated height adjustment mechanism of the present invention, shown in its locked uppermost position.

The unique foot-operated pedal height adjustment mechanism 16 of the preferred embodiment of riding mower 10 is illustrated in detail in FIGS. 6 and 7. As shown, mechanism 16 includes a pedal 104 which consists essentially of a rubberized face portion 106 secured to a rigid support member 108 which extends through slot 110 in foot rest 112 (see FIG. 2). The lower portion 114 of support member 108 is pivotally secured to the underside of foot rest 112, preferably by means of bracket 116, studs 118, and nuts 120.

Rigidly secured to the distal end of lower portion 114 is plate 122 which engages the first curved end of link 124, the second end of 124 being similarly secured to height adjustment plate 126. For simplicity, it is preferred that link 124 comprise a solid rod having curved first and second end portions, the first and second end portions being inserted and suitably retained within holes in plates 122 and 126, respectively.

Height adjustment plate 126 is slidably disposed on transverse tube 128, which is pivotally secured to the underside of frame 40 by conventional means known to those skilled in the art. Connecting member 130 is rigidly secured to tube 128 (by welding, for example) and is adjustably attached to plate 126 by means of screws 132 extending through slots 134 and 136, and nuts 138. This preferred configuration provides for an additional degree of adjustment for height adjustment mechanism 16, wherein nuts 138 may be loosened temporarily and plate 126 rotated slightly about tube 128, thereby changing the relative position between plate 128 and connecting member 130.

Also rigidly secured to tube 128 (by welding, for example) are support arms 140 which are pivotally secured to members 142 which extend from generally opposite transverse sides of cutting deck 80. For the sake of convenience, only the left-hand side support arm 140 and member 142 are illustrated in detail, the operation of the right-hand side components being virtually identical.

Height adjustment plate 126 includes a generally vertical slot 144 which is adapted to engage the lower end 146 of generally vertical link 148. The upper end 150 of link 148 is selectively positionable among one of several indentations 152 formed in support plate 154. When cutting deck 80 is lowered to one of several cutting positions, the upper edge of slot 144 bears downwardly on lower end 146 of link 148, thereby forcibly maintaining upper end 150 in its selected indentation. When cutting deck 80 is raised in its uppermost, locked position, discussed in detail below, the tension is removed from link 148, thereby necessitating the use of the spring 156 to maintain upper end 150 in its preselected position.

In the preferred embodiment shown, height adjustment mechanism 16 is capable of maintaining cutting deck 80 at five different cutting levels, one cutting level corresponding to each of the five indentations 152. Those skilled in the art, however, will recognize that any number of cutting height levels may be incorporated within the confines of the present invention. The relative positions of pedal 104, height adjustment plate 126, link 148, support arms 140, and cutting deck 80 are shown for three positions designated by the letters A, B, and C in FIG. 6. As shown, position A represents the lowest available cutting height for cutting deck 80, position B represents an intermediate cutting height, and position C represents the highest cutting height available for normal cutting.

In FIG. 7, height adjustment mechanism 16 is shown in its locked uppermost position which can be used for cutting, but is generally intended for use when clearing large obstacles or when traversing areas which do not need to be cut. In order to allow for this locked position, height adjustment mechanism 16 includes locking member 158 mounted to pedal 104 adjacent face 106. Spring 160 serves to maintain locking member 158 generally in the position shown in FIGS. 6 and 7. Depressing pedal 104 causes catch 162 to engage the forward edge of slot 164 in foot rest 112. As shown in FIG. 7, the locking of pedal 104 in its forward-most position raises plate 126 sufficiently to release the tension on the lower end 146 of link 148, so that lower end 146 is free to slide within slot 144. With height adjustment mechanism in this locked position, the upper end 150 of link 148 may be repositioned to the indentation 152 corresponding to the desired cutting height.

Locking member 158 is released by slightly depressing 104 to relieve the pressure from catch 162, and depressing tab 166, thereby causing locking member 158 to pivot slightly about screw 168 and disengaging catch 162 from slot 164. Upon the release of tab 158 by the user's foot, locking member 158 returns to its original position by virtue of the tension produced spring 160. By incorporating the unique locking member 158 onto pedal 104 as shown, cutting deck 80 may be raised to its uppermost position, conveniently locked into place, and easily released back to its original cutting height with minimum fuss and attention by the user.

It is preferred that link 148 be constructed from a single solid rod, with ends 146 and 150 being bent at generally right angles to the central body portion. When so constructed, the lower end 146 may be conventionally retained within slot 144, and the upper end 150 conventionally retained within the opening in support plate 154, with a rubber knob disposed on end 150 for the comfort and convenience of the user.

While the principals of providing a pedal-operated height adjustment mechanism, an air-assisted discharge system, and a friction controlled hydrostatic shift linkage have been made clear by the above disclosure, it will be immediately apparent to those skilled in the art that there are many possible modifications to the disclosed arrangement of components without departing from the basic spirit of the present invention. Accordingly, the following claims are intended to cover and embrace not only the specific embodiment disclosed herein, but also such modifications within the spirit and scope of this invention.

What is claimed:

1. In a riding mower having an engine, a frame, a height-adjustable cutting deck suspended beneath said frame, cutting means driven by said engine, a variable-speed hydrostatic transmission driven by said engine and having a speed adjustment member operatively disposed thereon, and grass collection means, the improvements comprising:

pedal-operated cutting deck height adjustment means;

transmission control means, having a control lever extending generally upwardly adjacent said seat, the lower end of said control lever being operatively connected to linkage means extending to said hydrostatic transmission, said linkage means including friction generating means for resisting inadvertent movement of said linkage means and said control lever; and air supply means for blowing air into at least a portion of said grass collection means.

2. A riding mower as defined in claim 1, wherein said pedal operated deck height adjustment means comprise:

a lever pivotally mounted to a portion of the frame generally adjacent the user's foot when the user is in normal riding position, said lever having a pedal portion protruding upwardly through an opening in said frame and suitable for engagement by the user's foot, and a lower portion disposed beneath said frame;

a transverse rod rotatably mounted to the underside of the frame, said rod having at least one arm member fixedly secured thereto, said at least one arm member. extending generally rearwardly and having a distal end rotatably secured to an upper portion of said cutting deck so that rotational movement of said rod causes vertical displacement of said distal end and corresponding displacement of said cutting deck;

a plate member fixedly secured to said rod; and a connecting link extending between said lower portion of said lever and said plate member, a first end of said link being operatively secured to said lower portion of said lever and a second end being operatively secured to said plate, whereby, upon depression of said pedal portion by the user's foot, said connecting link translates rotational movement of said lower portion of said lever into rotational movement of said rod, and consequential vertically upward movement of said cutting deck, with downward movement of said cutting deck being effected upon release of said pedal portion by the user's foot.

3. A riding mower as defined in claim 2, further comprising:

releasable locking means disposed on said pedal portion of said lever for automatically locking said pedal in its forwardmost position upon complete depression thereof by the user, said locking means being releasable by the user's foot, whereby, upon complete depression of said pedal portion and consequent engagement of said locking means, said cutting deck is locked in its uppermost position.

4. A riding mower as defined in claim 2, further comprising variable height setting means associated with said deck height adjustment means for selectively controlling the vertical position of said cutting deck upon release of said petal portion.

5. A riding mower as defined in claim 4, wherein said variable height setting means comprise:

a generally vertically inclined support member having a central portion and upper and lower opposite end portions, said upper and lower end portions being oriented at substantially right angles to said central position; wherein said upper end portion is disposed in a horizontal slot in said frame, the bottom edge of said slot having a plurality of indentures formed therein, each of said indentures corresponding to a different cutting height and being configured to receive said upper end portion and prohibit fore and aft movement thereof;

said lower end portion is disposed in a vertical slot in said plate member;

said horizontal slot is longitudinally offset with respect to said vertical slot so that movement of said upper end portion from one of said indentures to an adjacent indenture results in incremental vertical movement of said lower end portion; and said lower end portion of said support member is operative to engage the top of said vertical slot upon release of said pedal portion, thereby limiting the degree of rotation of said plate member and said rod, whereby the user of said mower can selectively set the cutting deck height by depressing said pedal portion to disengage said lower end portion of said support member from the top of said vertical slot, moving said upper end portion to one of said indentures corresponding to the desired cutting height, and releasing said pedal portion.

6. A riding mower as defined in claim 1 wherein said linkage means comprise:

a control rod, having an upper curved portion secured to said control lever, a first downwardly extending portion, a lateral portion extending transversely across a rear portion of said frame and being rotatably mounted thereto, and a second downwardly extending portion having a distal end; and a longitudinal link having first and second ends, said first end being operatively secured to said distal end of said control rod, said second end being operatively secured to the speed adjustment member disposed on said variable speed hydrostatic transmission, wherein said friction generating means are associated with said distal end of said control rod.

7. A riding mower as defined in claim 6 wherein said friction generating means comprise:

a bracket rigidly secured to an inner rear portion of said frame and extending generally inwardly and upwardly therefrom;

a portion of said bracket having a horizontal slot formed therein and disposed closely adjacent said distal end of said control rod;

means for slidably connecting said distal end to said bracket, at least a portion of said connecting means being disposed within said horizontal slot; and compression means for generating; compressive forces between said distal end and said slotted portion of said bracket, said compressive forces being operative to increase the coefficient of sliding friction acting on said portion of said bracket, thereby resisting fore and aft movement of said distal end.

8. A riding mower as defined in claim 7, wherein said friction generating means further comprise:
   at least one friction element disposed between said distal end and said slotted portion of said bracket.

9. A riding mower as defined in claim 7, wherein said friction generating means further comprise:
   a plurality of friction elements disposed adjacent opposite sides of said slot, one of said frictional elements being disposed between said distal end and said slotted portion of said bracket, said friction elements being maintained in contact with said bracket by said compression means.

10. A riding mower as defined in claim 1, wherein said grass collection means comprise at least one container suitably mounted to said frame and duct means extending from said cutting deck to said at least one container, said air supply means comprising:
    a blower mounted on said cutting deck, said blower having an air inlet and an air outlet; and
    a conduit providing fluid communication between said air outlet and a portion of said duct means.

11. A riding mower as defined in claim 10, wherein said conduit includes a distal end and a proximal end, and:
    said proximal end of said conduit is connected to said blower at said air outlet; and
    said distal end of said conduit is connected to said duct means at a portion closely adjacent said cutting deck.

12. A riding mower as defined in claim 10, wherein:
    said blower is mounted to a centrally located portion of the upper surface of said cutting deck.

13. A riding mower as defined in claim 10, wherein said blower is driven by said engine.

14. A riding mower comprising:
    an engine;
    a frame, having horizontally disposed first and second footrest portions extending therefrom on opposite sides of said mower, said first footrest portion having at least one slot formed therein, said footrest portions having opposing upper and lower surfaces;
    a cutting deck suspended beneath said frame, having height adjustment means associated therewith, said height adjustment means being operative to selectively raise and lower said cutting deck;
    a pedal member having an upper, foot-operated portion, an intermediate portion extending generally vertically through said at least one slot in said first footrest portion, and a lower transverse portion rotatably mounted to said lower surface of said first footrest portion;
    linkage means, operatively connecting said lower portion of said pedal member to said height adjustment means, whereby said cutting deck may be raised and lowered by depressing and releasing, respectively, said foot-operated portion of said pedal member; and
    variable height setting means associated with said height adjustment means for selectively controlling the vertical position of said cutting deck upon release of said foot-operated portion of said pedal member, the operation of said variable height setting means being independent from the operation of said foot-operated portion of said pedal member.

15. A riding mower as defined in claim 14, further comprising:
    locking means associated with said foot-operated portion of said pedal member, for automatically locking said foot-operated portion in its fully depressed position upon complete depression thereof, said locking means being releasable by the user's foot.

16. A riding mower as defined in claim 14, wherein said height adjustment means comprise:
    a transverse rod rotatably mounted to the underside of said frame, said rod having at least one arm member fixedly secured thereto;
    said at least one arm member extending generally rearwardly and having a distal end rotatably secured to an upper portion of said cutting deck, so that rotational movement of said rod causes vertical displacement of said distal end and corresponding displacement of said cutting deck; and
    a plate member fixedly secured to said rod.

17. A riding mower as defined in claim 16, wherein said linkage means comprise:
    a connecting link extending between and operatively secured to said lower portion of said pedal and said plate member.

18. A riding mower as defined in claim 16, wherein said variable height setting means comprise:
    a generally vertically inclined support member having a central portion and upper and lower opposite end portions, said upper and lower end portions being oriented at substantially right angles to said central portion; wherein
    said upper end portion is movably disposed in a generally horizontal slot in said frame, the bottom edge of said slot having a plurality of indentures formed therein, each of said indentures corresponding to a different cutting height and configured to receive said upper end portion and prohibit fore and aft movement thereof;
    said lower end portion is disposed in a vertical slot in said plate member;
    said horizontal slot is longitudinally offset with respect to said vertical slot so that movement of said upper end portion from one of said indentures to an adjacent indenture results in incremental vertical movement of said lower end portion; and
    said lower end portion of said support member is operative to engage the top of said vertical slot upon release of said foot-operated portion of said pedal member, thereby limiting the degree of rotation of said plate member and said rod;
    whereby the user of said mower can selectively set the cutting deck height by depressing said foot-operated portion to disengage the lower end portion of said support member from the top of said vertical slot, moving said upper end portion to one of said indentures corresponding to the desired cutting height, and releasing said foot-operated portion of said pedal member.

19. A riding mower as defined in claim 14, further comprising:
    a seat operatively secured to said frame;
    a variable-speed hydrostatic transmission driven by said engine; and
    transmission control means, having a control lever extending generally upwardly adjacent said seat, the lower end of said control lever being operatively connected to linkage means extending transversely across said frame to said hydrostatic transmission, said linkage means including friction generating means for resisting inadvertent movement of said linkage means and said control lever.

20. A riding mower as defined in claim 14, further comprising:
grass collection means; and
air supply means for blowing air into at least a portion of said grass collection means.

21. A riding mower comprising:
an engine;
a frame;
a seat secured generally to an upper surface of said frame;
a cutting deck suspended beneath said frame;
a variable-speed hydrostatic transmission driven by said engine and having a speed adjustment member operatively disposed thereon; and
transmission control means, having a control lever extending generally upwardly adjacent said seat, the lower end of said control lever being operatively connected to linkage means extending to said hydrostatic transmission, said linkage means including friction generating means for resisting inadvertent movement of said linkage means and said control lever.

22. A riding mower as defined in claim 21, wherein said linkage means comprise:
a control rod, having an upper curved portion secured to said control lever, a first downwardly extending portion, a lateral portion extending transversely across a rear portion of said frame and being rotatably mounted thereto, and a second downwardly extending portion having a distal end;
a longitudinal link having first and second ends, said first end being operatively secured to said distal end of said control rod, said second end being operatively secured to the speed adjustment member disposed on said variable speed hydrostatic transmission;
wherein said friction generating means are associated with said distal end of said control rod.

23. A riding mower as defined in claim 22, wherein said friction generating means comprise:
a bracket rigidly secured to an inner rear portion of said frame and extending generally inwardly and upwardly therefrom;
a portion of said bracket having a horizontal slot formed herein and disposed closely adjacent said distal end of said control rod;
means for slidably connecting said distal end to said bracket, at least a portion of said connecting means being disposed within said horizontal slot; and
compression means for generating compressive forces between said distal end and said slotted portion of said bracket, said compressive forces being operative to increase the coefficient of sliding friction between said distal end and said slotted portion of said bracket thereby resisting fore and aft movement of said distal end.

24. A riding mower as defined in claim 23, wherein said friction generating means further comprise:
at least one friction element disposed between said distal end and said slotted portion of said bracket.

25. A riding mower as defined in claim 23, wherein said friction generating means further comprise:
a plurality of friction elements disposed adjacent opposite sides of said slot, one of said friction elements being disposed between said distal end and said slotted portion of said bracket, said friction elements being maintained in contact with said bracket by said compression means.

26. A riding mower as defined in claim 21, further comprising:
grass collection means; and
air supply means for blowing air into at least a portion said grass collection means.

27. a riding mower comprising:
an engine operatively engaging at least one pulley;
a frame;
a cutting deck suspended beneath said frame, said cutting deck having belt-driven grass cutting elements associated therewith;
grass collection means; and
belt-driven air supply mean for blowing air into at least a portion of said grass collection means, said air supply means being disposed on said cutting deck such that a single belt driven by said pulley is employed to drive both said air supply means and said grass cutting elements.

28. A riding mower as defined in claim 27, wherein said grass collection means comprise at least one container suitably mounted to said frame and duct means extending from said cutting deck to said at least one container, said air supply means comprising;
a blower mounted on said cutting deck, said blower having an air inlet and an air outlet; and
conduit providing fluid communication between said air outlet and a portion of said duct means.

29. A riding mower as defined in claim 28, wherein said conduit includes a distal end and a proximal end; and
said proximal end of said conduit is connected to said blower at said air outlet; and
said distal end of said conduit is connected to said duct means at a portion closely adjacent said cutting deck.

30. A riding mower as defined in claim 28, wherein:
said blower is mounted to a centrally located portion of the upper surface of said cutting deck.

31. A rider mower comprising;
an engine;
a frame, having horizontally disposed first and second footrest portions extending therefrom on opposite sides of said mower, said first footrest portion having at least one slot formed therein, said footrest portions having opposing upper and lower surfaces;
a cutting deck suspended beneath said frame, having height adjustment means associated therewith, said height adjustment means being operative to selectively raise and lower said cutting deck;
said height adjustment means comprising a transverse rod rotatably mounted to the under side of said frame, said rod having at least one arm member fixedly secured thereto, said at least one arm member extending generally rearwardly and having a distal end rotatably secured to an upper portion of said cutting deck, so that rotational movement of aid rod causes vertical displacement of said distal end and corresponding displacement of said cutting deck, and a plate member fixedly secured to said rod;
a pedal member having an upper, foot-operated portion, an intermediate portion extending generally vertically through said at least one slot in said first footrest portion, and a lower transverse portion rotatably mounted to said lower surface of said first footrest portion; and linkage means, operatively connecting said lower portion of said pedal member to said height adjustment means, whereby said cutting deck may be raised and lowered by depressing and releasing, respectivley, said foot-operated portion of said pedal member.

32. A riding mower as defined in claim 31, wherein said linkage means comprise:

a connecting link extending between and operatively secured to said lower portion of said pedal and said plate member.

33. A riding mower as defined in claim 31, further comprising variable height setting means associated with said height adjustment means for selectively controlling the vertical position of said cutting deck upon release of said foot-operated portion of said pedal member.

34. A riding mower as defined in claim 31, wherein said variable height setting means comprise:

a generally vertically inclined support member having a central portion and upper and lower opposite end portions, said upper and lower end portions being oriented at substantially right angles to said central portion; wherein said upper end portion is movably disposed in a generally horizontal slot in said frame, the bottom edge of said slot having a plurality of indentures formed therein, each of said indentures corresponding to a different cutting height and configured to received said upper end portion and prohibit fore and aft movement thereof;

said lower end portion is disposed in a vertical slot in said plate member;

said horizontal slot is longitudinally offset with respect to said vertical slot so that movement of said upper end portion from one of said indentures to an adjacent indenture results in incremental vertical movement of said lower end portion; and said lower end portion of said support member is operative to engage the top of said vertical slot upon release of said foot-operated portion of said pedal member, thereby limiting the degree of rotation of said plate member and said rod, whereby the user of said mower can selectively set the cutting deck height by depressing said foot-operated portion to disengage the lower end portion of said support member from the top of said vertical slot, moving said upper end portion to one of said indentures corresponding to the desired cutting height, and releasing said foot-operated portion of said pedal member.

35. A riding mower comprising:

an engine;

a frame, having horizontally disposed first and second footrest portions extending therefrom on opposite sides of said mower, said first footrest portion having at least one slot formed therein, said footrest portions having opposing upper and lower surfaces;

a seat operatively secured to said frame;

a cutting deck suspended beneath said frame having height adjustment means associated therewith, said height adjustment means being operative to selectively raise and lower said cutting deck;

a pedal member having an upper, foot operated portion, an intermediate portion extending generally vertically through said at least one slot in said first footrest portion, and a lower transverse portion rotatably mounted to said lower surface of said first footrest portion;

linkage means, operatively connecting said lower portion of said pedal member to said height adjustment means, whereby said cutting deck may be raised and lowered by pressing and releasing, respectively, aid foot operated portion of said pedal member;

a variable-speed hydrostatic transmission driven by said engine; and transmission control means, having a control lever extending generally upwardly adjacent said seat, the lower end of said control lever being operatively connected to linkage means extending transversely across said frame to said hydrostatic transmission, said linkage means including friction generating means for resisting inadvertent movement of said linkage means and said control lever.

* * * * *